United States Patent
Baker (10) Patent No.: US 10,057,566 B2
(45) Date of Patent: Aug. 21, 2018

(54) DEPTH OF FIELD INDICATION USING FOCUS-PEAKING PICTURE MARKERS

(71) Applicant: Tektronix, Inc., Beaverton, OR (US)

(72) Inventor: Daniel G. Baker, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 425 days.

(21) Appl. No.: 14/587,766

(22) Filed: Dec. 31, 2014

(65) Prior Publication Data
US 2015/0288957 A1    Oct. 8, 2015

Related U.S. Application Data

(60) Provisional application No. 61/975,624, filed on Apr. 4, 2014.

(51) Int. Cl.
*H04N 17/02* (2006.01)
*H04N 5/232* (2006.01)
*G03B 13/30* (2006.01)

(52) U.S. Cl.
CPC .............. *H04N 17/02* (2013.01); *G03B 13/30* (2013.01); *H04N 5/23212* (2013.01); *H04N 5/23222* (2013.01); *H04N 5/23293* (2013.01)

(58) Field of Classification Search
CPC ........ H04N 17/00; H04N 17/02; H04N 17/04; H04N 5/445
USPC ........................................................ 348/184
See application file for complete search history.

(56) References Cited

U.S. PATENT DOCUMENTS

| | | | | |
|---|---|---|---|---|
| 6,480,300 | B1* | 11/2002 | Aoyama | G06T 5/004 358/1.9 |
| 6,798,455 | B1* | 9/2004 | Abe | G02B 7/365 348/353 |
| 2003/0218776 | A1* | 11/2003 | Morimoto | G06T 7/0083 358/2.1 |
| 2009/0175554 | A1 | 7/2009 | Matsushita | |
| 2010/0310166 | A1* | 12/2010 | Moriya | G06T 5/003 382/167 |
| 2011/0267540 | A1* | 11/2011 | Nakatsuka | G06T 5/004 348/625 |

FOREIGN PATENT DOCUMENTS

EP    2048877 A2    4/2009

OTHER PUBLICATIONS

European Search Report, dated Jun. 15, 2015, EP Patent Application 15162449.1, 6 pages.

(Continued)

*Primary Examiner* — Michael Lee
(74) *Attorney, Agent, or Firm* — Marger Johnson; Andrew J. Harrington (57) ABSTRACT

A waveform monitor for generating a modified image from an original image includes a measuring system to select luminance frequency values of the original image that are above a first and a second threshold. A modifier changes selected pixels of the original image that fall above the first and second thresholds. In some embodiments these changed pixels are given a false color as color markers to indicate DOF and areas of sharpest focus of the original image. Methods of modifying images in this manner are also described.

11 Claims, 5 Drawing Sheets
(2 of 5 Drawing Sheet(s) Filed in Color)

(56) References Cited

OTHER PUBLICATIONS

CINELITE On-Picture Exposure Measurements, http://www.leaderamerica.com/cinelite-cinezone-5-bar-display/, Dec. 31, 2014, 2 pages, Leader.
Focus Peaking, http://en.wikipedia.org/wiki/Focus_peaking, Dec. 31, 2014, 1 page, Wikipedia.

* cited by examiner

DEPTH OF FIELD INDICATION USING FOCUS-PEAKING PICTURE MARKERS

CROSS REFERENCE TO RELATED APPLICATIONS

This application claims benefit of U.S. Provisional application 61/975,624, entitled MULTIPLE FOCUS-PEAKING PICTURE MARKERS ALLOWING DEPTH OF FIELD INDICATION FOR ADJUSTING CAMERA FOCUS, filed on Apr. 4, 2014, the teachings of which are incorporated herein by reference.

TECHNICAL FIELD

This disclosure is directed to a method of displaying information on a monitor, and, more particularly, to an apparatus and method of creating a focus peaking false-color overlay that simultaneously indicates both the point of sharpest focus and the range of focus or depth-of-field (DOF).

BACKGROUND

"On-set" or "on-site" video and film production often requires precise camera lens focus/aperture adjustment to set the focused area of the image frame and the depth-of-field (DOF) to determine how much of the image content should be focused. Often there are artistic reasons to minimize the DOF to target the viewer's attention to a particular section of the image which may not be in the center of the image. Sometimes it is possible to zoom-in on the area of attention and set the focus but this is not always possible without re-framing or when tracking focus on subjects moving to or from the camera. Also, not all lenses hold focus over the entire zoom range.

Presently, both film and video production use high quality cameras with high resolution imagers of 4K pixels or more. Therefore, it has become more difficult to set focus precisely without using a large reference monitor. Unfortunately, small viewfinder-size monitors are typically all that is available on the camera or on set. These viewfinder-monitors often have a means of indicating the focused region of the image by adding a false colored marker over the displayed camera image. These are often called "focus peaking" or just "peaking" overlays. Oftentimes, even illustrating the focus peaking overlays do not provide the user with as much focus information as desired.

Embodiments of the invention address these and other limitations of the prior art.

SUMMARY OF THE DISCLOSURE

Embodiments of the invention include a real-time method of creating a focus peaking false-color overlay that simultaneously indicates both the point of sharpest focus and the range of focus or depth-of-field (DOF).

Some embodiments of the invention include a waveform monitor having an image input that includes a measuring system to measure frequency information for pixels from the input image. A converter selects high-frequency values from the frequency information and a selector selects first portions of the high-frequency values as first control information and second portions of the high-frequency values as second control information. A modifier changes selected pixels of the original image that fall within the first portions and the second portions of the high-frequency values. In some embodiments these changed pixels are given a false color.

Other embodiments include methods of generating a display for output from a measurement instrument. Example methods include receiving an original image formed of pixels, extracting frequency information from the pixels, and selecting a first and second range of frequencies that fall above a first and second frequency thresholds, respectively. Then, the original image is modified by changing original pixels that fall within the first range of frequencies and changing original pixels that fall within the second rage of frequencies range of frequencies to produce a modified image. In some embodiments the modifying includes falsely coloring the selected pixels.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
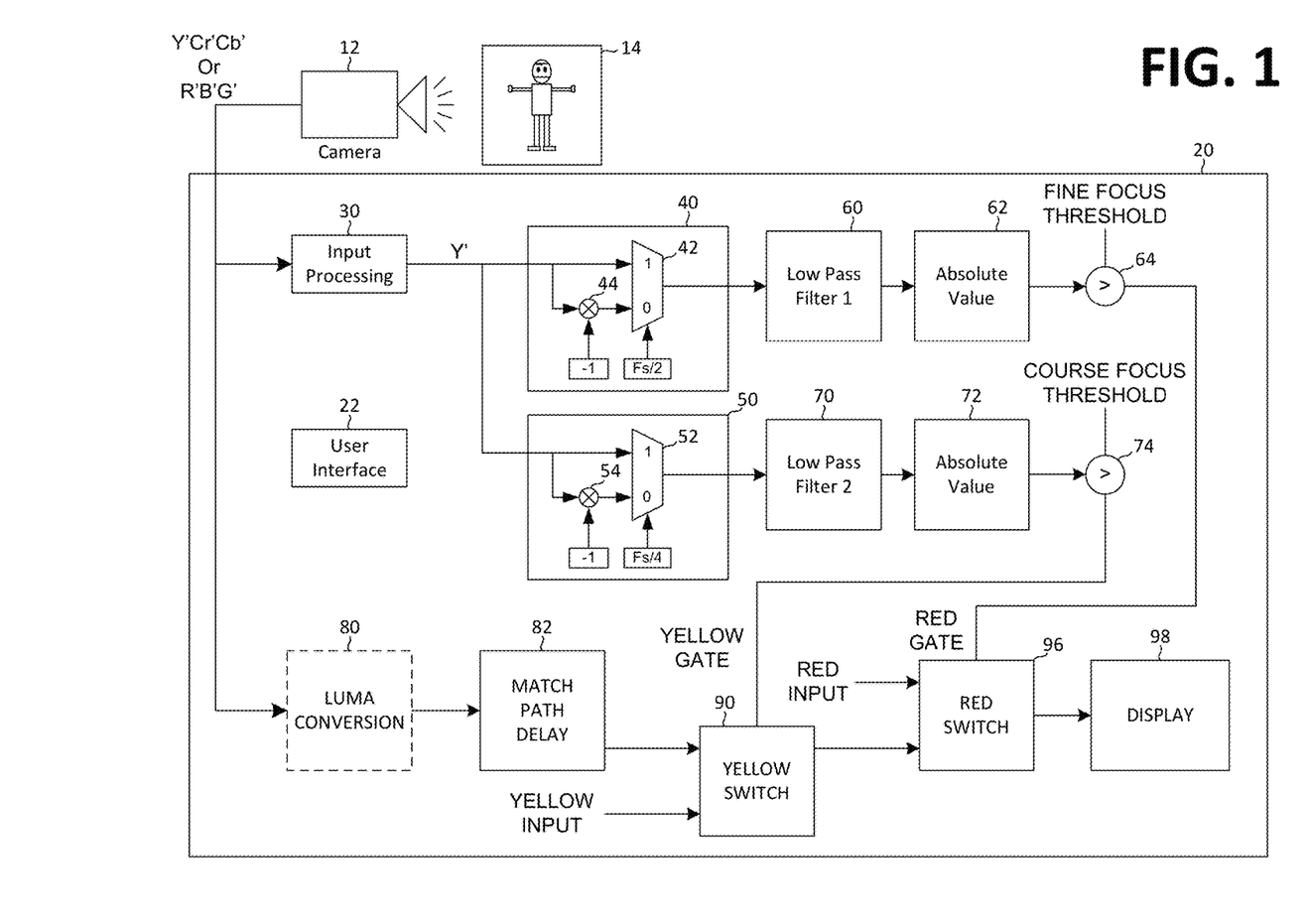
FIG. 1 is a block diagram of an example Video Waveform Monitor including picture markers according to embodiments of the invention.

FIG. 1 is a block diagram showing material portions of an example Video Waveform Monitor according to embodiments of the invention. As illustrated in FIG. 1, a Waveform Monitor 20 is coupled to and receives input from a camera 12 that is pointed at a subject 14. The camera 12 may produce still or moving images. The camera 12 typically includes adjustments for focus and the depth of the field of focus (DOF) that may be controlled by a camera operator, or the adjustments may be automatically controlled. The camera 12 output is input to the Waveform Monitor 20. The output from the camera 12 may be gamma corrected, or log corrected, Y'Cr'Cb or R'G'B' components. This correction may occur in the camera 12, modifying signals from a linear function of the camera's light input, to a non-linear transfer function to obtain adequate dynamic range or bit-size of the output signals. Commonly used gamma transfer functions have been used in television and computer images for many years and coincidently approximate the non-linear human vision lightness function. The human vision lightness function is often approximated as a cube-root (exponent of ⅓) power-law function and many of these common gamma-correction functions (sRGB, REC-601, REC709, etc.) also follow power-laws with exponents in the range of 1/2.2 to 1/2.6. Therefore, when gamma correction is applied to the signals, the prime notation is used. As mentioned above, this correction is usually performed in the camera 12 and the camera output signal is typically R',G',B' or Y',Cb',Cr'. Newer cameras may have both a gamma corrected proxy output as well as a high dynamic range output with log processing for recording to further compress the newer imagers high dynamic range light sensitivity. Embodiments of the invention work with any of these outputs.

In the Wave Form Monitor 20, the camera 12 output is first processed by an input processor 30 to isolate a digital luminance, Y', of the image. The digital luminance Y' is then passed to a fine mixer 40 as well as a coarse mixer 50, before being passed to a first low-pass-filter 60 and a second low-pass-filter 70, respectively.

The fine mixer 40 includes a multiplexer 42 controlled by, for example, a square-wave input having a frequency of Fs/2, where Fs is the Y' sample-rate. The coarse mixer 50 includes a multiplexer 52 controlled by, for example, a square-wave input having a frequency of Fs/4. The path through the fine mixer 40 and low-pass-filter 60 is the fine or sharp focus path, while the path through the coarse mixer 50 and low-pass-filter 70 is the coarse focus or Depth-of-Field (DOF) path.

Figure 2:
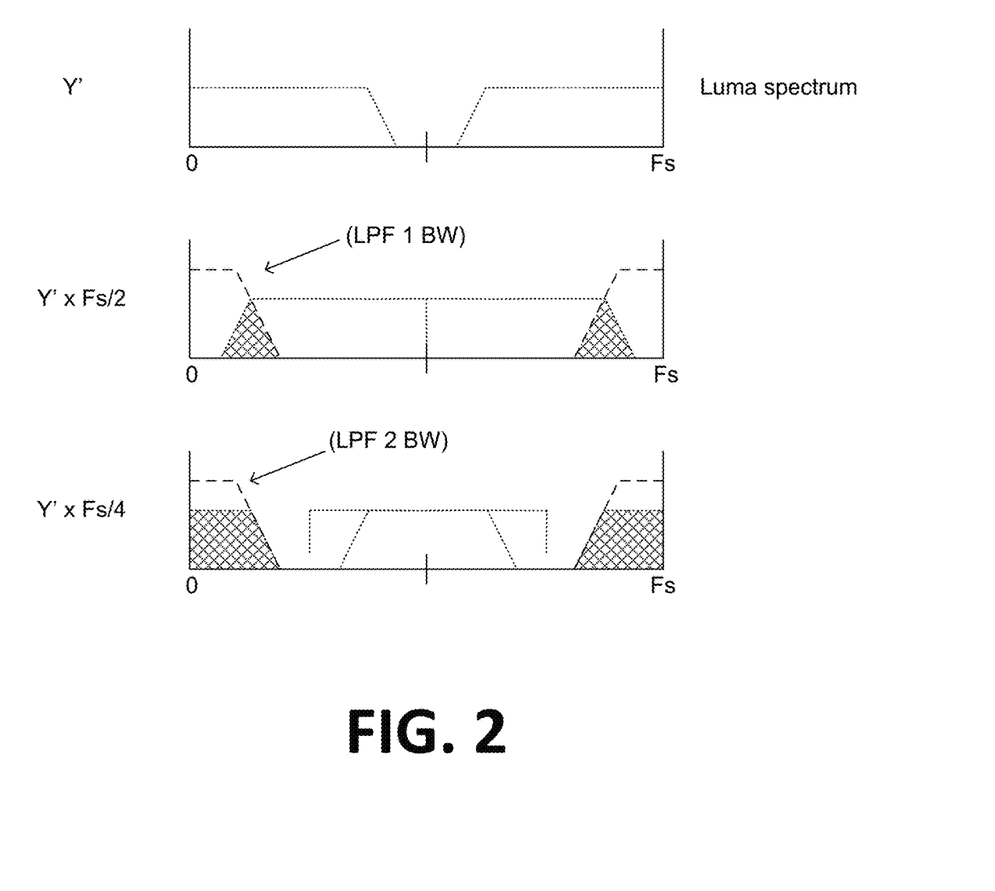
FIG. 2 is a graph showing a sample luminance spectrum output, as well as a spectrum of two low-pass-filter outputs overlaid with the luminance spectrum output, as used by embodiments of the invention.

The signals driving the multiplexers 42, 52 are preferably square wave signals so the mixing processes are implemented as digital multiplexers selecting between Y' and minus Y' at the local oscillation rate (i.e., Fs/2 or Fs/4, depending on the focus path) thereby multiplying Y' by plus and minus one by multipliers 44, 54, respectively. With digital processing, the function of the multipliers 44, 54 to multiply unsigned input data by −1 is merely a negative sign representation of the unsigned input data, which simplifies processing. The spectrum of each mixer output with the Low Pass Filter (LPF) filter response overlaid is illustrated in FIG. 2.

The signed mixer output from the fine mixer 40 is filtered with a low pass filter 60, and then an absolute value of the filter output is taken in Abs element 62. Similarly, the signed mixer output from the coarse mixer 50 is filtered with a low pass filter 70, and then an absolute value of the filter output is taken in Abs element 72. Each unsigned absolute value signal is then compared with separate thresholds in comparators 64, 74, respectively, to develop a first binary gate to mark the image area of fine focus as well as a second binary gate signal to mark the image area of coarse or wide focus (DOF).

In the example of FIG. 1, the original output signal from the camera 12 is optionally converted to monochrome (black and white) in a luma converter 80, and then delayed in a delay element 82 to match the processing delay of the mixer+LPF paths. This monochrome signal is then applied to switches or multiplexers 90, 96 which allows a gate signal output from the respective comparator 64 or 74 to select a different false color for each gate signal. For example, as illustrated in FIG. 1, a red color is used for the fine focus indication on the image and yellow for the coarse focus. Alternatively, other colors or visible patterns such as cross-hatch or zebra stripes could also be selected by the gate signals.

The yellow switch 90 and/or red switch 96 then insert either a respective yellow or red color overlying the original portions of the monochrome image that indicate on the image a depth of focus (yellow), and areas of highest frequency of the image, which indicates the areas of tightest focus of the image. The remaining pixels, i.e., those pixels having focus levels outside of the specified focus threshold values from the original image, may be shown on the display 98 without change. If the luma conversion block 80 is present and active, then the un-modified portions of the original image will be presented as black and white. Otherwise, the un-modified portions of the original image will be in the same form as received from the camera 12. The combined highlighted image is then sent to the display 98 for viewing. In some embodiments the display 98 may be a monitor or display that is separate from the Wave Form Monitor 20.

Figure 4A:
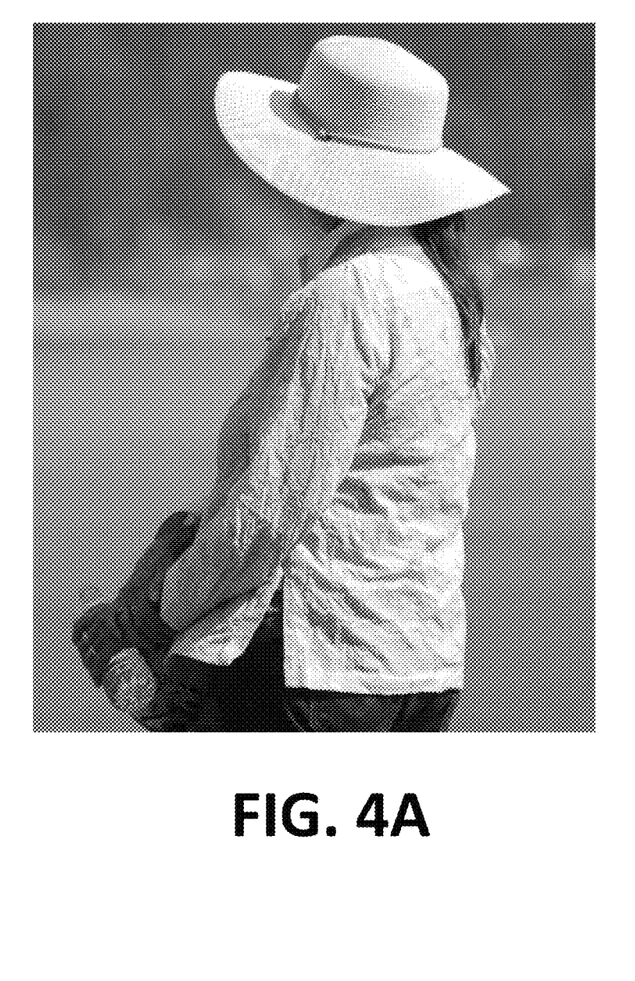
FIG. 4A is a base image capture that may be used by embodiments of the invention.
Figure 4B:
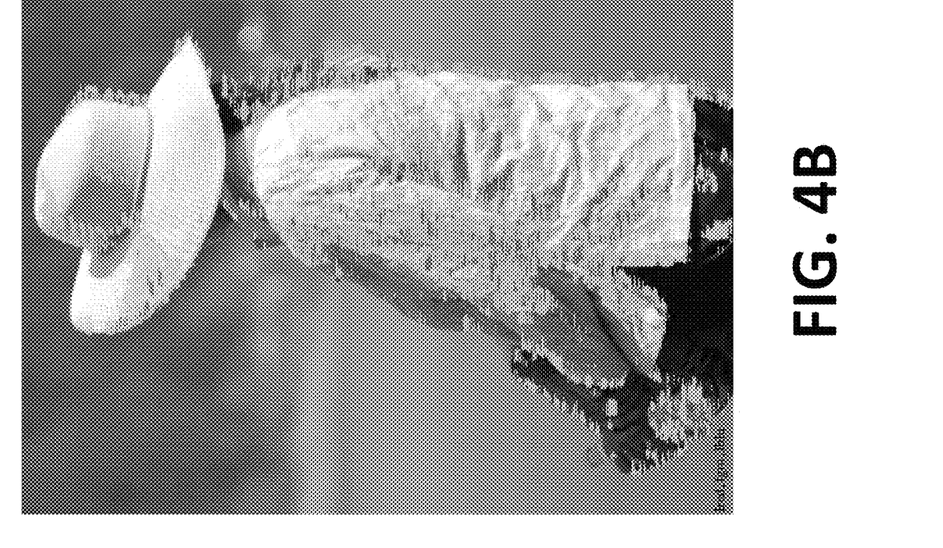
FIG. 4B illustrates the based image of FIG. 4A that has been marked with picture markers to indicate areas of focus according to embodiments of the invention.
Figure 5A:
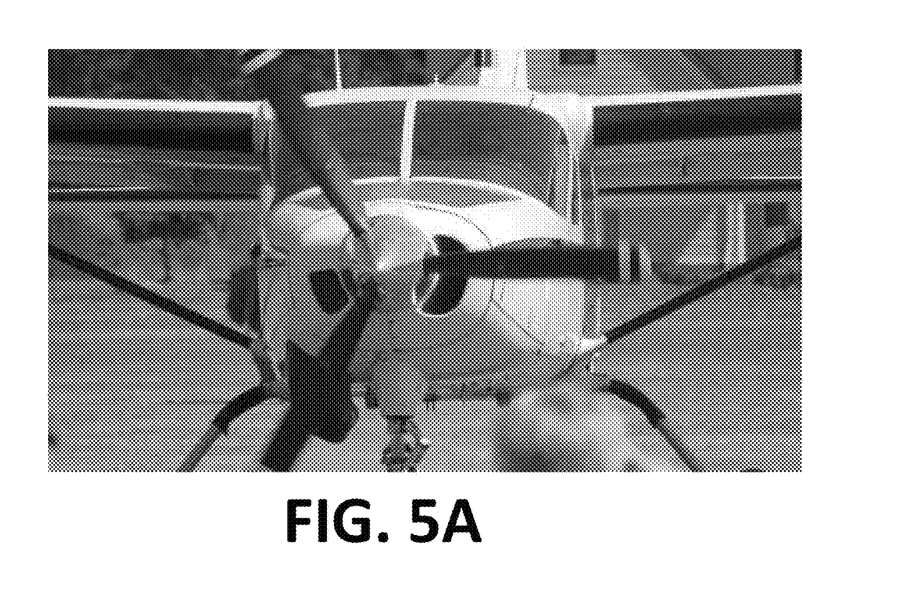
FIG. 5A is a base image capture that may be used by embodiments of the invention.
Figure 5B:
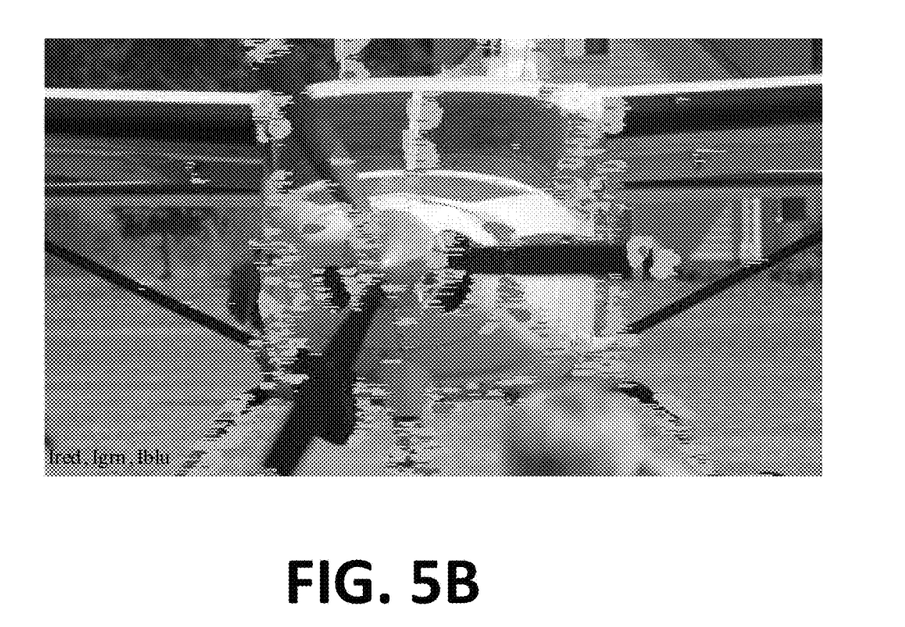
FIG. 5B illustrates the based image of FIG. 5A that has been marked with picture markers to indicate areas of focus according to embodiments of the invention.

For example, with reference to FIGS. 4A and 4B, the original, non-modified monochrome image is illustrated in FIG. 4A. This is the image created from the output of the luma converter 80 in FIG. 1. Inspection of FIG. 4B shows that the DOF is overlaid or highlighted on the monochrome image in yellow, while the areas of sharpest focus are overlaid or highlighted on the monochrome image in red. The red areas (finest focus) are typically surrounded by yellow areas (coarse focus), but may have a common edge. Of course, the colors or patterns substituted for the DOF and the areas of sharpest focus are user selectable. With reference back to FIG. 1, the area in FIG. 4B illustrated in yellow originates from the yellow value input to the yellow switch 90, while the area in FIG. 4B illustrated in red originates with the red value input to the red switch 96. Different colors or patterns could be implemented by providing desired colors or patterns at the color inputs to the yellow and red switches 90, 96.

Assuming that the indicated red and yellow values are used, the red and yellow marker colors can either have a fixed saturation and brightness, or may instead be proportional to the input signal luminance, or could be a combination of both, before being applied to the gated switches or multiplexers 90, 96.

In other embodiments, the Wave Form Monitor 20 may include more than two focus zones for highlighting. For example, by including additional focus paths such as those set forth in FIG. 1 in a Wave Form Monitor, a user may control three, four, or any desired number of separate focus zones, each producing an individual color marker.

In operation, a user may use a user interface 22 to control several parameters of the Wave Form Monitor 20. For instance filter parameters of the low pass filters 60, 70 may be user selectable. Additionally, a fine focus threshold input to the comparator 64 allows the user to select which areas of the image are indicated by the fine focus indicator. In some embodiments users may set the fine focus threshold so high that only the DOF is indicated on the resulting color-marked image. Users may also use the user interface 22 to select color inputs for the fine and course markers. As described above, FIG. 1 shows these marker colors as red and yellow, but any color or pattern may be used to indicate the areas of focus.

Figure 3:
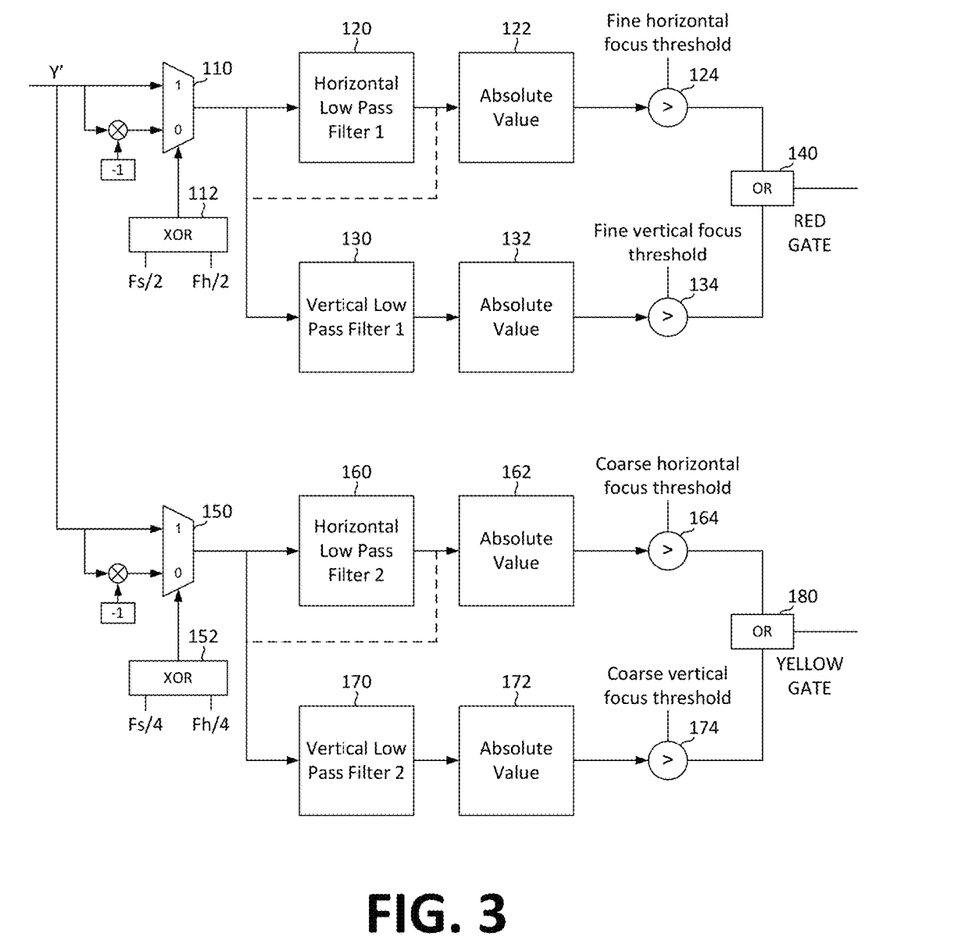
FIG. 3 is a block diagram of central components of another example Video Waveform Monitor including picture markers according to embodiments of the invention.

FIG. 3 is a block diagram of central components of another example Video Waveform Monitor including picture markers according to embodiments of the invention. In general, the components of FIG. 3 add another set of filters to each of the course and fine paths to allow for both horizontal and vertical focus detection, as described below. The components of FIG. 3 may operate with the remaining components in FIG. 1. For example, the Y' input in FIG. 3 may be the output from the input processor 30 of FIG. 1. The gate outputs from the OR gates 140 and 180 may be used to respectively control the red switch 96 and yellow switch 90 of FIG. 1, for example.

The components of FIG. 3 scan the image in both the horizontal and vertical directions, while the components of FIG. 1 scan the image in only the horizontal direction. Scanning in both the horizontal and vertical directions allows for increased fidelity in the focus markings.

Instead of including a single low pass filter 60 for the fine focus detection of FIG. 1, the components of FIG. 3 include a fine horizontal low pass filter 120 as well as a vertical low pass filter 130. The horizontal and vertical low pass filters 120, 130 may be coupled in parallel, or the vertical low pass filter 130 may optionally be coupled to the output of the horizontal low pass filter 120, which makes the system more sensitive to horizontal edges rather than vertical edges. A multiplexer 110 is driven by the output of an XOR gate 112, which preferably has square-wave inputs having frequencies of Fs/2 and Fh/2. As above, the Fs/2 is one-half the frequency of the frequency of the Y' signal, while Fh/2 is one-half the line rate for the particular video format being analyzed. Driving the XOR gate 112 with the two signals Fs/2 and Fh/2 creates a similar output to having two separate multiplexers. In the illustrated embodiment, each of the low pass filters 120, 130 is passed to a respective absolute value processor 122, 132, which functions as described above.

In addition to the fine focus path including two low pass filters, the coarse focus path also includes a horizontal low pass filter 160 and a vertical low pass filter 170 respectively coupled to absolute value processors 162, 172. The differences between the fine and coarse focus paths include the signals driving the XOR gates 112, 152 and the threshold settings to the comparators 124, 134, 164, and 174.

An OR gate 140 generates the red gate signal, i.e., the control signal for adding red color, when either the frequency information of the horizontal edge or vertical edge of the image being analyzed triggered the fine focus threshold. An OR gate 180 generates the yellow gate signal when either the horizontal edge or vertical edge exceeded the coarse focus threshold. In each case the vertical and horizontal thresholds for both the fine and course focus paths are user settable, for example by using the user interface 22 (FIG. 1).

The Waveform Monitor 20, or any parts of it, may be embodied in firmware, such as an FPGA, specifically designed circuitry such as an ASIC, or may be implemented by one or more software process running on one or more processors. In other embodiments the Waveform Monitor 20 may include may include a combination of components or operations running on firmware, ASICs, FPGAs, and software, for example.

Although specific embodiments of the invention have been illustrated and described for purposes if illustration, it will be understood that various modifications may be made without departing from the spirit and scope of the invention.

What is claimed is:

1. A method of generating a modified image for output from a waveform monitor having an image input and coupled to a monitor for viewing the modified image, the method comprising:
   receiving an original image formed of pixels at the image input;
   extracting, by a processor, frequency information from the pixels;
   selecting a first range of frequencies that fall above a first frequency threshold;
   selecting a second range of frequencies that fall above a second frequency threshold, the first range of frequencies different than the second range of frequencies; and
   modifying, by the processor, the original image by modifying original pixels that fall within the first range of frequencies and by modifying original pixels that fall within the second rage of frequencies range of frequencies to produce the modified image for output,
   in which modifying original pixels that fall within the first range of frequencies comprises falsely coloring the original pixels that fall within the first range with a predetermined color, and
   in which selecting a first range of frequencies that fall above a first frequency threshold comprises:
      passing a series of digital luminance values from the original image through a horizontal frequency filter; and
      passing the series of digital luminance values from the original image through a vertical frequency filter.

2. The method of generating a modified image for output from a waveform monitor having an image input and coupled to a monitor for viewing the modified image according to claim 1, further comprising displaying the modified image on the monitor.

3. The method of generating a modified image for output from a waveform monitor having an image input and coupled to a monitor for viewing the modified image according to claim 1, in which extracting, by a processor, frequency information from the pixels comprises extracting, by the processor, luminance information from the pixels.

4. The method of generating a modified image for output from a waveform monitor having an image input and coupled to a monitor for viewing the modified image according to claim 1, in which modifying original pixels that fall within the second range of frequencies comprises falsely coloring the original pixels that fall within the second range with a different predetermined color than those pixels that fall within the first range.

5. The method of generating a modified image for output from a waveform monitor having an image input and coupled to a monitor for viewing the modified image according to claim 1 in which selecting a first range of frequencies is user controlled.

6. The method of generating a modified image for output from a waveform monitor having an image input and coupled to a monitor for viewing the modified image according to claim 1, in which selecting a first range of frequencies that fall above a first frequency threshold comprises:
   passing a series of digital luminance values from the original image through a low pass filter.

7. The method of generating a modified image for output from a waveform monitor having an image input and coupled to a monitor for viewing the modified image according to claim 6 in which selecting a first range of frequencies that fall above a first frequency threshold further comprises:
   comparing an output from the low pass filter to a threshold comparator.

8. A waveform monitor having an image input and coupled to a monitor for viewing a measurement display, the waveform monitor comprising:
   a measuring system to measure frequency information for pixels from an original image received at the image input;
   a converter structured to generate high-frequency values from the frequency information;
   a selector structured to select first portions of the high-frequency values as first control information;
   a second selector structured to select second portions of the high-frequency values as second control information; and a modifier structured to change selected pixels of the original image based on the first control information and the second control information, in which the modifier is structured to falsely color pixels of the original image with a pre-set color, and in which the converter structured to generate high frequency values comprises a first low pass filter structured to filter frequency information in a horizontal direction and a second low pass filter structured to filter frequency information in a vertical direction.

9. The waveform monitor according to claim 8 in which the modifier is structured to falsely color pixels of the original image that correspond to the first portions with a first pre-set color, and structured to falsely color pixels of the original image that correspond to the second portions with a second pre-set color.

10. The waveform monitor according to claim 8 in which the converter structured to generate high frequency values comprises a low pass filter.

11. The waveform monitor according to claim 8 in which the converter structured to generate high frequency values comprises a first low pass filter having an input at a first frequency and comprises a second low pass filter having an input at a second frequency different than the first frequency.

* * * * *